US006733628B2

(12) United States Patent
Dinwoodie et al.

(10) Patent No.: US 6,733,628 B2
(45) Date of Patent: May 11, 2004

(54) METHOD OF MAKING FIBRE-BASED PRODUCTS AND THEIR USE

(75) Inventors: John Dinwoodie, Wirral (GB); Kathleen E. Wade, Northwich (GB); Stella M. Young, Chester (GB)

(73) Assignee: Saffil Limited, Widnes (GB)

( * ) Notice: Subject to any disclaimer, the term of this patent is extended or adjusted under 35 U.S.C. 154(b) by 0 days.

(21) Appl. No.: 10/220,047

(22) PCT Filed: Feb. 27, 2001

(86) PCT No.: PCT/GB01/00839

§ 371 (c)(1),
(2), (4) Date: Nov. 7, 2002

(87) PCT Pub. No.: WO01/65008

PCT Pub. Date: Sep. 7, 2001

(65) Prior Publication Data

US 2003/0121631 A1 Jul. 3, 2003

(30) Foreign Application Priority Data

Feb. 28, 2000 (GB) .............................................. 0004681

(51) Int. Cl.[7] .............................................. D21H 15/10
(52) U.S. Cl. ...................... 162/145; 162/146; 162/206; 162/149
(58) Field of Search ................ 162/141, 145, 162/146, 149, 152, 157.1, 157.3, 169, 206, 109; 422/179–180

(56) References Cited

U.S. PATENT DOCUMENTS

| | | | | |
|---|---|---|---|---|
| 3,674,621 A | * | 7/1972 | Haruo et al. | 162/146 |
| 3,957,573 A | * | 5/1976 | Miyamoto et al. | 162/102 |
| 4,305,992 A | * | 12/1981 | Langer et al. | 428/324 |
| 5,139,615 A | * | 8/1992 | Conner et al. | 162/145 |
| 5,167,765 A | * | 12/1992 | Nielsen et al. | 162/146 |
| 5,482,686 A | * | 1/1996 | Lebold et al. | 422/179 |
| 5,502,937 A | * | 4/1996 | Wilson | 52/273 |
| 5,736,109 A | * | 4/1998 | Howorth et al. | 422/179 |
| 5,955,177 A | * | 9/1999 | Sanocki et al. | 428/210 |
| 6,051,193 A | * | 4/2000 | Langer et al. | 422/179 |
| 6,251,224 B1 | * | 6/2001 | Dong | 162/145 |
| 6,267,843 B1 | * | 7/2001 | Helwig et al. | 162/145 |

FOREIGN PATENT DOCUMENTS

| | | | | |
|---|---|---|---|---|
| EP | 279511 A2 | * | 8/1988 | D01F/8/06 |
| EP | 465203 A1 | * | 1/1992 | D04H/1/54 |
| EP | 0 834 936 | | 4/1998 | |
| FR | 2 677 672 | | 12/1992 | |
| GB | 2125458 A | * | 3/1984 | D01F/8/06 |

\* cited by examiner

*Primary Examiner*—Jose A. Fortuna
(74) *Attorney, Agent, or Firm*—Nixon & Vanderhye P.C.

(57) ABSTRACT

Thermoplastic fibers of different melting points are present in an aqueous slurry of refractory fibers, binder and flocculant. The slurry is passed through a screen to form a wet body which is heated to dry the body and melt the thermoplastic fibers to bind the refractory fibers together.

11 Claims, No Drawings

METHOD OF MAKING FIBRE-BASED PRODUCTS AND THEIR USE

This application is the US national phase of international application PCT/GB01/00839 filed Feb. 27, 2001 which designated the U.S.

The invention relates to a method of making fibre-based products and their use. One particular application of the invention is the manufacture of a mat like article to hold a catalytic converter inside a can at high temperature.

According to one aspect of the invention there is provided a method of making a fibre-based article, the method comprising:

forming an aqueous slurry containing a major proportion of refractory fibres and a minor proportion of thermoplastic fibres which comprises fibres having two different melting points, one lower than the other;

adding a binder and a flocculating agent;

passing the slurry containing the refractory fibres, thermoplastic fibres, binder and flocculating agent through a perforate screen to deposit a body of wet fibres on the screen;

heating the body to remove the water and to melt the lower melting point thermoplastic fibres to bind the refractory fibres to form a preform; and thermomoulding the preform then cooling under pressure to form the article.

In another aspect there is provided a dry preform article comprising a major proportion of refractory fibres having a mean length of about 4 cm and a mean diameter of up to about 6 micron, held together by melted thermoplastic fibres and having a substantially uniform density over its area.

Preferably the fibres making up the major proportion are relatively short, say up to 4 cm in length and up to say 6 micron in diameter. The fibres are preferably inorganic fibres such as alumina, mullite, silica, zirconia; graphite: they may be used alone or with other materials such as intumenescent plate materials; particulates; or any materials like these. Combinations may be used. Most preferably the fibres are the ones available under the registered trade mark SAFFIL.

The thermoplastic fibres may be selected from a wide variety of suitable materials having different melting points. The choice is determined by compatability with the other fibres and the temperature at which the fibres melt. The function of this lower melting component is to bond the refractory fibres and hold them together until they are exposed to the temperature at which the thermoplastic fibres are decomposed. Typically suitable fibres are olefins such as polyethylene and polypropylene; polyesters: polyamines. It is preferred to use bicomponent fibres which have having a core and a sheath made of different plastics. Suitable materials are available from different suppliers, e.g. "Trevira 255" available from Trevira Fasem, Hartmann Huth, Frankfurt, Germany and "Adhesion C special" fibres available from Fibrevisions. Denmark. The concentration of thermoplastic fibres in the final product may vary; generally we prefer about 10% by weight.

The binder is preferably a latex; the flocculating agent is preferably a polyelectrolyte.

When the deposited body of wet fibres is heated the water is removed and the lower melting point thermoplastic material melts to bind the fibres to form a substantially self-supporting body. The refractory fibres are anchored in the solidified thermoplastic. Because of the way in which the article has been made it has substantially the same consistency and density throughout. The thermoplastic gives the mat integrity making it easier to handle and process.

A further step of thermoulding under compression provides a dense inorganic fibre mat of bulk density suitable for use, e.g. in the monolith in the application.

The process may be batch or continuous.

The article may be used as a support between the inner surface of a catalytic convertor can and the convertor itself. The article may be in the form of mat up to say 8 mm thick which can be used in number of known "canning" techniques. When the convertor is first heated the thermoplastic will burn away to provide a porous resilient structure which holds and supports the catalytic body in place over a prolonged period despite the vibration and fluctuations in temperature. The resulting composition of fibres or fibres (and intrumescent particulates if present) exerts a pressure which supports the delicate convertor during its life. An advantage of the invention is that because it is so self-supporting and resistant to high temperature it is possible to use a mat of the invention in a high temperature environment, for example in a close coupled application, e.g. near an engine exhaust manifold. The mat may be used in vehicles having gasoline, Diesel engines or the like.

In order that the invention may be well understood it will now be described by way of illustration only with reference to the following examples.

EXAMPLE 1

Alumina fibres measuring about 3 micron in diameter and having a mean length of about 4 cm were added to water in a concentration of about 0.1% by weight to form a slurry. The solids were prevented from settling by gentle agitation. Bicomponent fibres having a core of polypropylene and a sheath of polyethylene and of a size compatible with the alumina fibres were added in a concentration of 0.01% by weight. A standard acrylate latex was added and dispersed, followed by a flocculating agent. The mix was added to a vessel having a perforate floor, and the water was allowed to flow through leaving a pad-like deposit on the floor. This was allowed to dry and removed to an oven and heated to about 130° C. to fully dry the deposit and to melt the thermoplastic sheath of the bicomponent fibres to bond the alumina fibres together. The dry mat was then heated to 150° C. and cooled under compression to a thickness of about 5 mm. The formed mat was found to be of substantially uniform density across its area.

Portions of the mat were cut into shapes for an infill for a monolith support. The shapes were mounted in a can which was positioned in the style of a close coupled catalyst. When the catalyst was heated by the exhaust gases the thermoplastic reached its decomposition temperature and burned out, giving the mat a resilient porous fibre structure. The support mat was well able to hold the catalyst in the can, despite vibration and variation in temperature.

EXAMPLE 2

Alumina fibres measuring about 3 micron in diameter and having a mean length of about 4 cm were added to water in concentration of about 0.1% by weight to form a slurry. The solids were prevented from settling by gentle agitation. Bicomponent fibres having a core of polyethylene terphthalate and a sheath of polyethylene and of a size compatible with alumina fibres were added in a concentration of 0.01% by weight. A standard acrylate latex was added and dispersed followed by a flocculating polyelectrolyte agent. The mix was added to a vessel having a perforate floor and the water was allowed to flow through leaving a pad-like deposit on the floor. This was allowed to dry and removed to an oven and heated to about 130° C. to fully dry the deposit and to melt the thermoplastic sheath of the fibres to bond the alumina fibres together. The dry mat was then heated to 150° C. and cooled under compression to a thickness of about 5 mm. The formed mat was found to be of substantially uniform density across its area.

Portions of the mat were cut into shapes for an infill for a monolith support. The shapes were mounted in a can which was positioned in the style of a close coupled catalyst. When the catalyst was heated by the exhaust gases, the thermoplastic reached its decomposition temperature and burned out giving the mat a resilient porous fibre structure. The support mat was well able to hold the catalyst in the can, despite vibration and variation in temperature.

What is claimed is:

1. A method of making a mat having a substantially consistent density across its area, the method comprising:
   (a) forming an aqueous slurry containing fibres, wherein a major proportion are refractory fibres and a minor proportion are thermoplastic fibres which comprise fibres having two different melting points, one lower than the other;
   (b) adding a binder and a flocculating agent;
   (c) passing the slurry containing the refractory fibres, thermoplastic fibres, binder and flocculating agent through a perforate screen to deposit a body of wet fibres on the screen;
   (d) heating the body to remove the water and melt the lower melting point fibres to form a preform; and
   (e) thermoforming the preform under pressure to form the mat.

2. A method according to claim 1, wherein the thermoplastic fibres comprise bicomponent fibres comprising a core and a sheath.

3. A method according to claim 2, wherein the core is polypropylene or polyethylene terephthalate and the sheath is polyethylene.

4. A method according to claim 1, wherein the refractory fibres range up to 4 cm in length and up to 6 micron in diameter.

5. A method according to claim 1, wherein the binder is a latex.

6. A method according to claim 1, wherein the flocculating agent is a polyelectrolyte.

7. A method according to claim 1, wherein the refractory fibres are present in a concentration of about 0.1% by weight in the slurry.

8. A method according to claim 1, wherein the thermoplastic fibres are present in a concentration of about 0.01% by weight in the slurry.

9. A method according to claim 1, wherein the preform is heated to 150° C. and cooled under compression.

10. A method according to claim 1, wherein the thermoforming step comprises heating and cooling the preform under compression to form the mat having a substantially consistent density across its area.

11. A thermoformed preform article comprising fibres, wherein a minor proportion are thermoplastic fibres and a major proportion are refractory fibres having a mean length of about 4 cm and a mean diameter of about 6 micron, held together by the melted thermoplastic fibres, and having a substantially uniform density over its area.

* * * * *